Jan. 3, 1956     T. B. CAVANAUGH     2,729,075
UNIVERSAL JOINTS
Filed June 21, 1954     2 Sheets-Sheet 1
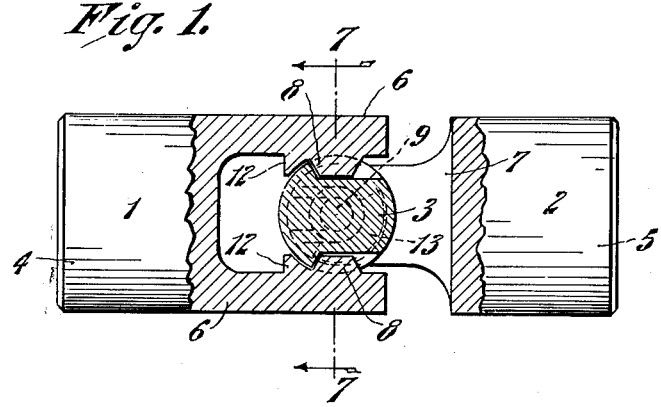
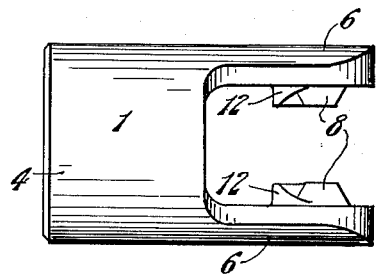 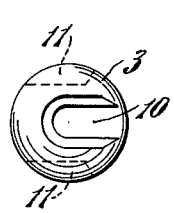 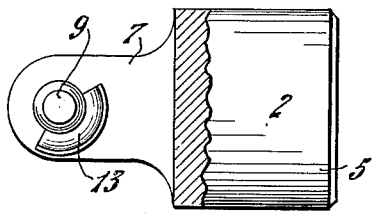
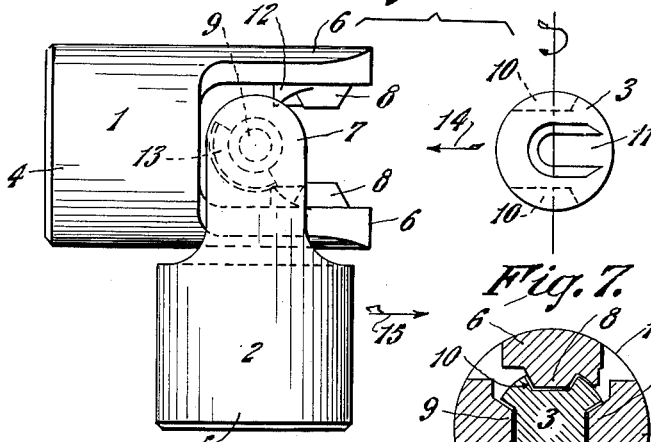 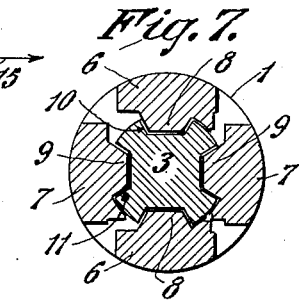 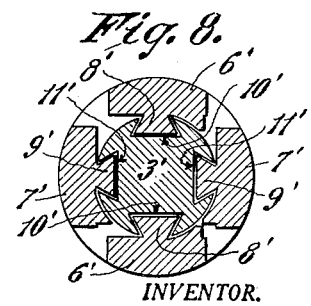
INVENTOR.
Thomas B. Cavanaugh,
BY
Attorney.

Jan. 3, 1956
T. B. CAVANAUGH
2,729,075
UNIVERSAL JOINTS
Filed June 21, 1954
2 Sheets-Sheet 2
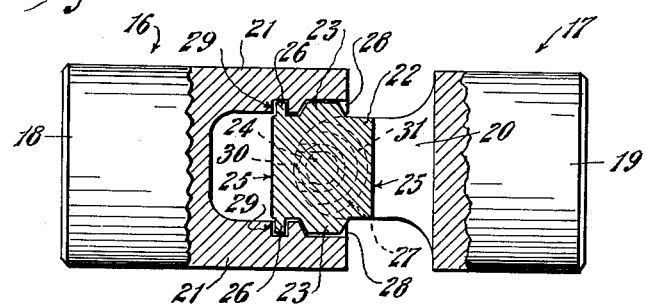
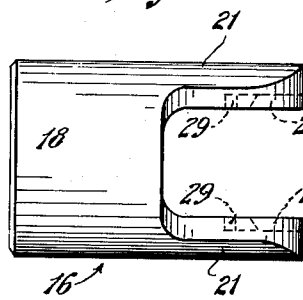
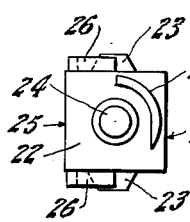
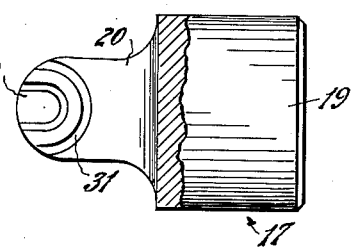
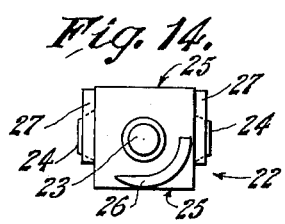
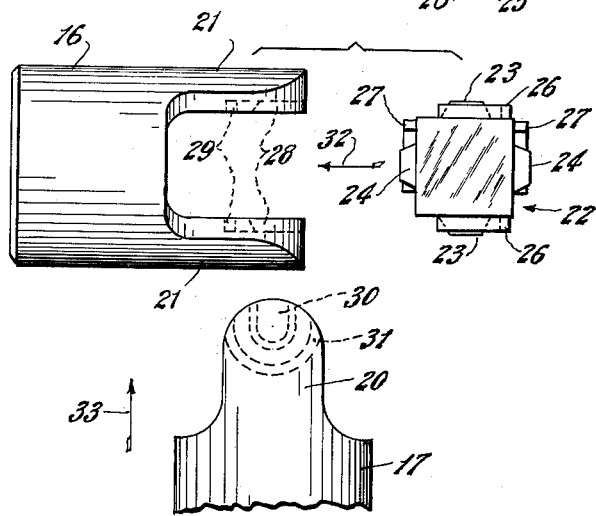
INVENTOR.
Thomas B. Cavanaugh,
BY
Blake Leaver,
Attorney

United States Patent Office 2,729,075
Patented Jan. 3, 1956

2,729,075
UNIVERSAL JOINTS
Thomas B. Cavanaugh, West Springfield, Mass.
Application June 21, 1954, Serial No. 438,062
4 Claims. (Cl. 64—17)

This invention relates to improvements in universal joints.

An object of this invention is the provision of a universal joint having only three parts comprising two identical fork members and a center block.

A further object of this invention is the provision of a universal joint which may be easily assembled and disassembled by anyone without the use of any tools whatever, so that, if desired, the parts may be marketed separately by the manufacturer and assembled by the purchaser.

A still further object of this invention is the provision of a universal joint which may be easily forged, cast, or die cast, and used without any further finishing or machine work.

Another object of this invention is the provision of a universal joint as described above which is materially stronger than joints now used having similar proportions or dimensions.

Still another object of this invention is the provision of a universal joint having a solid center or connecting block and fork members having no through bores or slots in the fork portions; the joint as assembled having no intersecting pins through forks and center blocks connecting them.

These and other objects and advantages of this invention will be clearly and completely disclosed and described in the following specification, the accompanying drawings, and the appended claims.

Preferred embodiments of this invention are illustrated in the accompanying drawings, in which Fig. 1 is an elevational view, partially in section, of the assembled universal joint, Fig. 2 is an elevational view of the left hand fork member shown in Fig. 1, Fig. 3 is a plan view of the center block as shown in Fig. 1, Fig. 4 is a sectional view of the right hand fork member shown in Fig. 1, Fig. 5 is an elevational view showing the parts in relative positions for assembly, Fig. 6 is an elevational view of the center block in the position it would assume when the joint parts are assembled in operating relationship, Fig. 7 is a cross sectional view taken on the line 7—7 of Fig. 1, Fig. 8 is a view similar to Fig. 7, illustrating a modified construction, Figs. 9 through 14 illustrate a further modification of the invention, in which Fig. 9 is an elevational view similar to Fig. 1, Fig. 10 is an elevational view of the left hand fork member shown in Fig. 9, Fig. 11 is an elevational view of the center block shown in Fig. 9 in the position it would assume when the joint parts are assembled in operating relationship, Fig. 12 is a sectional view of the right hand fork member shown in Fig. 9, Fig. 13 is an elevational view of the fork members and center block shown in Fig. 9 as they would appear arranged in relative position ready for assembly, and Fig. 14 is a plan view of the center block shown in Fig. 13, ready for assembly in the left hand fork member.

Referring now to the drawings in detail, in which like numerals refer to like parts throughout:

This universal joint has three parts only; two identical fork members 1 and 2, and a center block 3. The fork members 1 and 2 are formed in the usual manner with hub portions 4 and 5 and ears or arms 6 and 7, respectively. The hubs 4 and 5 may be solid, as shown, or bored, depending upon the customer's specifications.

The fork ears or arms 6 are formed with inwardly projecting, integral trunnions 8, having a common axis, and the fork ears or arms 7 are likewise provided with inwardly projecting, integral trunnions 9, also having a common axis.

The center block or ball 3 is formed with a pair of opposed recesses 10 adapted to receive the trunnions 8, and a second pair of opposed recesses 11 adapted to receive the trunnions 9, as best indicated in Fig. 3. The recesses 10 are extended in one direction to the exterior surface of the block or ball 3, and the recesses 11 are extended in a direction opposite to the recesses 10, also to the outer surface of the block or ball 3.

The fork arms 6 are also formed with opposed, arcuate ridges 12, extending inwardly from the inner faces of the ears 6, and have radii centered on the axis of the trunnions 8 and shaped to conform to the outer surface of the block 3. The fork ears 7 are also provided with like ridges 13, centered on the trunnions 9.

These arcuate ridges 12 and 13, when the joint is assembled with its three parts in operating relationship, cooperate with the trunnions 8 and 9 to lock the parts together, and prevent relative movement of the forks 1 and 2 in either direction axially.

In assembling the universal joint above described, the forks 1 and 2 are arranged at substantially right angles, as shown in Fig. 5, with the fork ears 7 of the fork 2 positioned between the trunnions 8 and hub 4 of the fork 1. The center ball or block 3 is positioned as shown in Fig. 5, with the recesses 10 facing toward the trunnions 8. The block is then moved in the direction of the arrow 14 until the trunnions 8 are engaged in the recesses 10. The block 3 is then revolved on the axis of the trunnions 8 and recesses 10 through approximately 180 degrees, until it assumes the relative position shown in Fig. 6. With th center block 3 in this latter position, relative to the forks 1 and 2, the fork 2 is moved outwardly, in the direction indicated by the arrow 15, until the trunnions 9 of the fork ears 7 register in the recesses 11 of the center block 3. The fork 2 is then revolved on the axis of the trunnions 9 through substantially 90 degrees, until it assumes the position shown in Fig. 1. The arcuate ridges 12 and 13 are so arranged or positioned, circumferentially, as to permit movement of the fork ears to register the trunnions in their respective recesses in the block 3, when the forks are arranged for assembly as shown in Fig. 5, and yet to prevent axial movement of the forks 1 and 2 toward each other when the forks are in operating relationship.

Whereas I have shown, in Figs. 1–7, inclusive, trunnions which are frusto-conical in shape, with sides diverging from their bases on the inner faces of the fork ears, it will be readily understood by those skilled in the art that these trunnions and their cooperating recesses in the center block may be any desired shape which will permit partial revolution of the trunnions in their recesses, or partial revolution of the center block 3 about the axes of the trunnions 8 and 9. For example, the trunnions 8 and 9 may be cylindrical, or they may be reversed from those shown in Figs. 1–7, inclusive, having sides diverging from their bases on the inner walls of the fork ears, as shown at 8' and 9' in Fig. 8.

In Fig. 8 is illustrated a modified form of joint in which fork ears 6' and 7' are formed with trunnions 8' and 9' respectively having side walls diverging from the inner surfaces of the fork ears. A center block 3' is formed with recesses 10' and 11' similar to the recesses 10 and 11, but formed to receive the trunnions 8' and 9'. An advantage of this modification of the invention is the locking of the trunnions to the center block, when assembled therewith, thereby preventing spreading of the fork ears which might occur if the joint were subjected to excessive strain in operation.

It will also be understood by those skilled in the art that the various elements of this universal joint may be rearranged in their cooperative relationship without departing from the scope of this invention. One embodiment of such a rearrangement of elements is illustrated in Figs. 9–14 inclusive.

Forks 16 and 17, having hubs 18 and 19 respectively, are formed with fork ears 20 and 21, respectively. A center block 22, substantially cubical in shape, is formed with a pair of integral, opposed, projecting trunnions 23, having a common axis; and a second pair of similar trunnions 24, also having a common axis. The axes of the trunnions 23 and 24 intersect at right angles at the approximate center of the block 22, and lie in a plane parallel to the blank faces 25 of the block 22. The center block 22 is also formed with a pair of arcuate, opposed, projecting ridges 26, concentric with and spaced from the trunnions 23; and a second pair of similar ridges 27 concentric with and spaced from the trunnions 24.

The fork ears 21 of the fork 16 are formed with recesses 28 adapted to receive the trunnions 23, and with arcuate slots 29, concentric with the recesses 28 and spaced therefrom and adapted to receive the ridges 26 on the center block 22. The recesses 28 are extended to the outer surfaces of the ends of the fork ears 19, as shown in Figs. 9, 10, and 13. The fork ears 20 of the fork 17 are identically formed with recesses 30 for receiving trunnions 24, and slots 31 for receiving ridges 27.

Fig. 13 illustrates the three parts of this universal joint in position ready for assembly. The center block 22, held in the position shown in Fig. 13, is moved in the direction of the arrow 32 until the trunnions 23 are engaged in the recesses 28. As shown in Fig. 14, the ends of the ridges 26 will register with the ends of the arcuate slots 29 and enter the same as the trunnions 23 are moved into register in the recesses 28. The center block 22 is then revolved on the axis of the trunnions 23 through substantially ninety degrees, thereby completely engaging the ridges 26 in the slots 29, and presenting the trunnions 24 and ridges 27, as shown in Fig. 11, in proper position to be engaged in the recesses 30 and 31 of the fork ears 20 as the fork 17 is moved in the direction of the arrow 33 in Fig. 13. The fork 17 is then moved about the axis of the trunnions 24 into operating position, as shown in Fig. 9.

Thus, the forks 16 and 17 are securely locked to the center block 22 against axial movement of the forks in either direction, and at the same time the forks 16 and 17 are free to revolve on the axes of the trunnions 23 and 24. Disassembly of the forks 16 and 17 from the center block 22 is easily accomplished by a reversal of the moves described for assembly.

In certain applications, where the shafts which are connected by my universal joint are supported against axial movement, the locking ridges may be omitted, and the forks will be held in operating relationship to the center block by the shafts to which the forks are connected.

Having thus described my invention, what I claim is:

1. In a universal joint having three parts only comprising a pair of identical fork members and a center block member, one of said members being formed with a pair of integral trunnions having a common axis, the other of said members being formed with recesses in which said trunnions are rotatably engaged, said recesses extending in one direction to the outer surface of said other member to permit insertion of said trunnions into said recesses, and interlocking means comprising oppositely disposed arcuate ridges on one of said members, said ridges being concentric with and spaced from said trunnions and engaging the other of said members only when said members are assembled in operating relationship to prevent disengagement of said trunnions from said recesses.

2. A universal joint comprising a pair of identically formed forks and a center block, each of said forks being formed with a pair of inwardly projecting trunnions having a common axis and a pair of inwardly projecting arcuate ridges concentric with and spaced from said trunnions, said center block being substantially spherical in shape and formed with a pair of bearing recesses on a common axis in which the trunnions of one of said forks are rotatably engaged and a second pair of bearing recesses on an axis perpendicular to the axis of said first named recesses in which the trunnions of the other of said forks are rotatably engaged, said first pair of bearing recesses being extended in one direction to the outer surface of said center block, and said second pair of bearing recesses being extended to the outer surface of said center block in a direction opposite to said first named pair of recesses, said ridges engaging the surface of said center block to prevent removal of said trunnions from said bearing recesses only when said forks and said center block are assembled in operating relationship.

3. A universal joint comprising a pair of identically formed forks and a center block, each of said forks being formed with a pair of inwardly projecting trunnions having a common axis and a pair of inwardly projecting arcuate ridges concentric with and spaced from said trunnions, said center block being substantially spherical in shape and formed with a pair of bearing recesses on a common axis in which the trunnions of one of said forks are engaged and a second pair of bearing recesses on an axis perpendicular to the axis of said first named recesses in which the trunnions of the other of said forks are engaged, said first pair of bearing recesses being extended in one direction to the outer surface of said center block, and said second pair of bearing recesses being extended to the outer surface of said center block in a direction opposite to said first named pair of recesses, said ridges being adapted to engage the surface of said center block when said forks and said center block are assembled in operating relationship, said ridges being positioned, circumferentially, relative to said trunnions, as to permit engagement and disengagement of said trunnions in said bearing recesses when said forks and said center block are angularly disposed out of operating relationship and to prevent disengagement of said trunnions from said bearing recesses when said forks and said center block are assembled in operating relationship.

4. A universal joint comprising a pair of identically formed forks and a center block, each of said forks being formed with a pair of spaced fork ears, said fork ears being formed with trunnion bearing recesses in their inner faces and arcuate grooves also in their inner faces, said grooves being concentric with and spaced from said recesses and extending across said inner faces to the sides of said ears, said recesses being extended full width to the ends of said ears, a substantially cubical center block formed with a pair of oppositely disposed integral projecting trunnions having a common axis and a second pair of similar trunnions having a common axis at right angles to the axis of said first pair of trunnions, said recesses providing bearings in which said trunnions are rotatably engaged, arcuate ridges on said block concentric with and spaced from said trunnions, said ridges being engaged in said grooves when said forks and said center block are assembled in operating relationship, and disengaged from said grooves when said forks are angularly disposed, relative to each other and to said center block out of operating relationship.

References Cited in the file of this patent

FOREIGN PATENTS 475,031    Canada _____ July 3, 1951